United States Patent
Wartluft

[11] Patent Number: 6,050,613
[45] Date of Patent: Apr. 18, 2000

[54] COMBINED PLASTIC PIPE COUPLER AND END PLUG

[75] Inventor: Donald W. Wartluft, Broken Arrow, Okla.

[73] Assignee: Continental Industries, Inc., Tulsa, Okla.

[21] Appl. No.: 09/122,235

[22] Filed: Jul. 24, 1998

Related U.S. Application Data

[63] Continuation-in-part of application No. 08/784,499, Jan. 17, 1997, Pat. No. 5,791,698, which is a continuation-in-part of application No. 08/626,024, Apr. 1, 1996, Pat. No. 5,692,785.

[51] Int. Cl.$^7$ .................................................. F16L 25/00
[52] U.S. Cl. .......................... 285/328; 285/901; 285/424; 285/371; 285/351; 285/179; 138/89
[58] Field of Search ................................. 138/89; 285/924, 285/328, 105, 901, 323, 351, 371, 179

[56] References Cited

U.S. PATENT DOCUMENTS

| | | | |
|---|---|---|---|
| Re. 33,946 | 6/1992 | Corzine | 285/45 |
| 1,580,694 | 4/1926 | Smith | 285/924 |
| 2,461,828 | 2/1949 | Lomelino | 285/2 |
| 3,594,021 | 7/1971 | Williams | 285/302 |
| 4,049,480 | 9/1977 | Kutschke | 156/94 |
| 4,083,583 | 4/1978 | Volgstadt et al. | 285/55 |
| 4,229,025 | 10/1980 | Volgstadt et al. | 285/105 |
| 4,282,175 | 8/1981 | Volgstadt et al. | 264/248 |
| 4,386,796 | 6/1983 | Lyall et al. | 285/31 |
| 4,407,526 | 10/1983 | Cicenas | 285/27 |
| 4,512,441 | 4/1985 | Cooper | 137/539 |
| 4,628,965 | 12/1986 | Passerell | 138/89 |
| 4,632,434 | 12/1986 | Procter et al. | 285/39 |
| 4,687,232 | 8/1987 | Zimmerman | 285/31 |
| 4,712,813 | 12/1987 | Passerell et al. | 285/250 |
| 4,804,209 | 2/1989 | Fischer | 285/31 |
| 4,810,008 | 3/1989 | Brodie | 285/31 |
| 4,836,581 | 6/1989 | Guilloteau | 285/31 |
| 4,921,281 | 5/1990 | Talyor | 285/924 |
| 4,923,221 | 5/1990 | Taylor | 285/924 |
| 4,932,686 | 6/1990 | Anderson, Jr. | 285/24 |
| 4,946,213 | 8/1990 | Guest | 285/31 |
| 4,991,629 | 2/1991 | Ernesto et al. | 138/89 |
| 4,991,882 | 2/1991 | Gahwiler | 285/331 |
| 5,024,469 | 6/1991 | Aitken et al. | 285/302 |
| 5,082,313 | 1/1992 | Bryant et al. | 285/15 |
| 5,094,494 | 3/1992 | McConnell | 285/318 |
| 5,141,258 | 8/1992 | Stine | 285/31 |
| 5,348,048 | 9/1994 | Schirado et al. | 285/361 |
| 5,378,023 | 1/1995 | Olbrich | 285/24 |
| 5,411,297 | 5/1995 | Brown | 285/62 |
| 5,433,482 | 7/1995 | Baddour | 285/31 |
| 5,474,336 | 12/1995 | Hoff et al. | 285/322 |
| 5,509,698 | 4/1996 | Habicht | 285/302 |
| 5,692,785 | 12/1997 | Wartluft et al. | 285/328 |
| 5,701,935 | 12/1997 | Vasudeva | 139/89 |

Primary Examiner—Eric K. Nicholson
Attorney, Agent, or Firm—Head, Johnson & Kachigian

[57] ABSTRACT

An end plug for a stab-type coupler for a plastic pipe, the coupler having a first shell with a passageway therethrough. The end plug includes a hollow, cylindrical portion having a first end and a second end. An end wall is sealably attached to the cylindrical portion first end. External threads are formed on the cylindrical portion at the first end wherein the external threads engage internal threads on an end of the first shell. At least one vent hole is provided in the cylindrical portion of the end plug between the internal threads and the second end with the vent hole allowing fluid to vent when the external threads are partially unthreaded from the internal threads on the shell.

11 Claims, 5 Drawing Sheets

COMBINED PLASTIC PIPE COUPLER AND END PLUG

CROSS-REFERENCE OF RELATED APPLICATION

This application is a continuation-in-part of U.S. patent application entitled PLASTIC PIPE COUPLER WITH INTERNAL SEALER, Ser. No. 08/784,499, filed Jan. 17, 1997, now U.S. Pat. No. 5,791,698 which is a continuation-in-part of U.S. patent application entitled PLASTIC PIPE COUPLER WITH INTERNAL SEALER, Ser. No. 08/626,024 filed Apr. 1, 1996, now U.S. Pat. No. 5,692,785, issued Dec. 2, 1997.

CROSS-REFERENCE TO MICROFICHE APPENDIX

This application is not related to any microfiche appendix.

BACKGROUND OF THE INVENTION

1. Field of the Invention

The present invention relates to a removable and replaceable end plug for a stab-type coupler wherein the end plug also serves to vent the pipeline.

2. Prior Art

The present invention is used with and includes a "stab-type" coupler designed to be installed manually on to the end of a length of plastic pipe.

End caps are commonly used when it is desired to terminate a pipeline or take a portion of a pipeline system out of service, either on a permanent or a temporary basis. When a pipeline is removed on a temporary basis, one may install an end cap so that another connection to the pipeline can be easily installed at a later date. An example would be in a residential housing development where the gas lines are laid in advance of attaching to the housing. Later, individual houses are added to the service. If the pipeline is under pressure, it may be desirable to vent the pressure of the existing pipeline before putting the removed pipeline back into service. Thus, it is desirable to have an end cap with a mechanism for venting the pressure in the pipeline.

In the past, end caps have been formed by molding or fusing an end cap on to the end of a stab-type coupler. U.S. Pat. No. 4,628,965 to Passerell for a stab-type coupler illustrates one example of a fused on end cap. An indicia or cutting line is provided on the end cap so the end cap will be cut off when the line is put in service. The end cap is not replaceable once removed.

FIG. 5 of Passerell shows an alternate embodiment with a threaded end cap but no provision is made for purging or venting of fluids in the line.

Accordingly, there remains a need for an end plug for use with a stab-type coupling that is both removable and replaceable.

Additionally, there remains a need for an end plug for use with a stab-type coupling that is capable of venting pressurized fluid in the line.

SUMMARY OF THE INVENTION

A removable and replaceable end plug is provided for a stab-type coupler. Stab-type couplers are used for attachment to a plastic pipe of the type having substantially uniform internal and external surfaces. The removable and replaceable end plug may be used when a section of pipeline is taken out of service or to provide a terminus for a pipeline system.

The end plug includes a cylindrical portion and an end wall to form a fluid tight enclosure. The cylindrical portion of the plug has the same inner diameter as: (1) a pipe being replaced; or (2) a pipe that will eventually replace the end plug.

The outer diameter of the cylindrical portion of the end plug is slightly less than (1) the pipe being replaced; or (2) the pipe that may eventually replace the end plug.

The coupler is formed of a hollow rigid coupler shell having opposed first and second ends. A passageway extends through the coupler shell defined by a larger internal diameter portion adjacent the first end and a smaller internal diameter portion adjacent the second end. An internal frusto-conical surface tapering towards the second end is provided on the interior surface of the hollow rigid coupler shell.

A straight tubular stiffener extends through the coupler and has an external diameter slightly smaller than the pipe and slightly small than the inside diameter of the end plug. The stiffener includes an O-ring or toirodal seal in a groove in the external surface. The end plug may, thus, be installed over the stiffener and O-ring.

In one embodiment, two coupler shells are, positioned end-to-end and secured within an exterior outer protective body, forming a coupler that will connect one length of pipe and one end plug in concentric end-to-end relationship. At least one of the coupler shells has a threaded end for receiving the end plug.

In another embodiment, coupler shells are supported adjacent a coupler body and are contained within an outer protective body with the passageways through the coupler shell arranged perpendicular to each other. One of these coupler shells has a threaded end for receiving the end plug. A fitting of this type provides an L-shaped connection for connecting two lengths of pipe at right angles to each other. One of the lengths of pipe is replaced by the end plug.

An important feature of the invention is that the plastic pipe or the end plug is coupled in a stab fitting providing for sealing internally of the pipe or end plug. The exterior surface of plastic pipe can be easily damaged. That is, it can be scratched or abraded and such defects on the external surface can sometimes make it difficult to secure a leak proof seal with the external surface. The chance of damage to the interior surface of a plastic pipe is substantially less. Therefore, by sealing on the interior surface the effectiveness of stab-type connectors is substantially improved. The end plug also operates to seal on the inside diameter of the cylindrical portion.

The end plug has external threads which engage internal threads on a shell end in the stab-type coupler. The end plug is installed by: (1) pushing the cylindrical portion of the end plug axially into an opening in the stab-type coupler over the stiffener until the external threads abut the internal shell end threads; and (2) rotating or turning the end plug to advance the end plug until the external and internal threads are fully engaged.

For removal, a two step process is employed. First, the end plug is rotated counter-clockwise to unthread and disengage the end plug threads from the shell end threads. During this process, the vent holes travel from inside of an O-ring seal to the outside of the O-ring seal. When the vent holes are located outside the O-ring seal, the vent holes release any pressurized fluid. To facilitate this fluid release, a portion of the end plug external threads is flattened.

After de-pressurization, the end plug may be unthreaded the rest of the way and the end plug is then pulled axially away from the coupler.

DETAILED DESCRIPTION OF THE PREFERRED EMBODIMENTS

Figure 1:
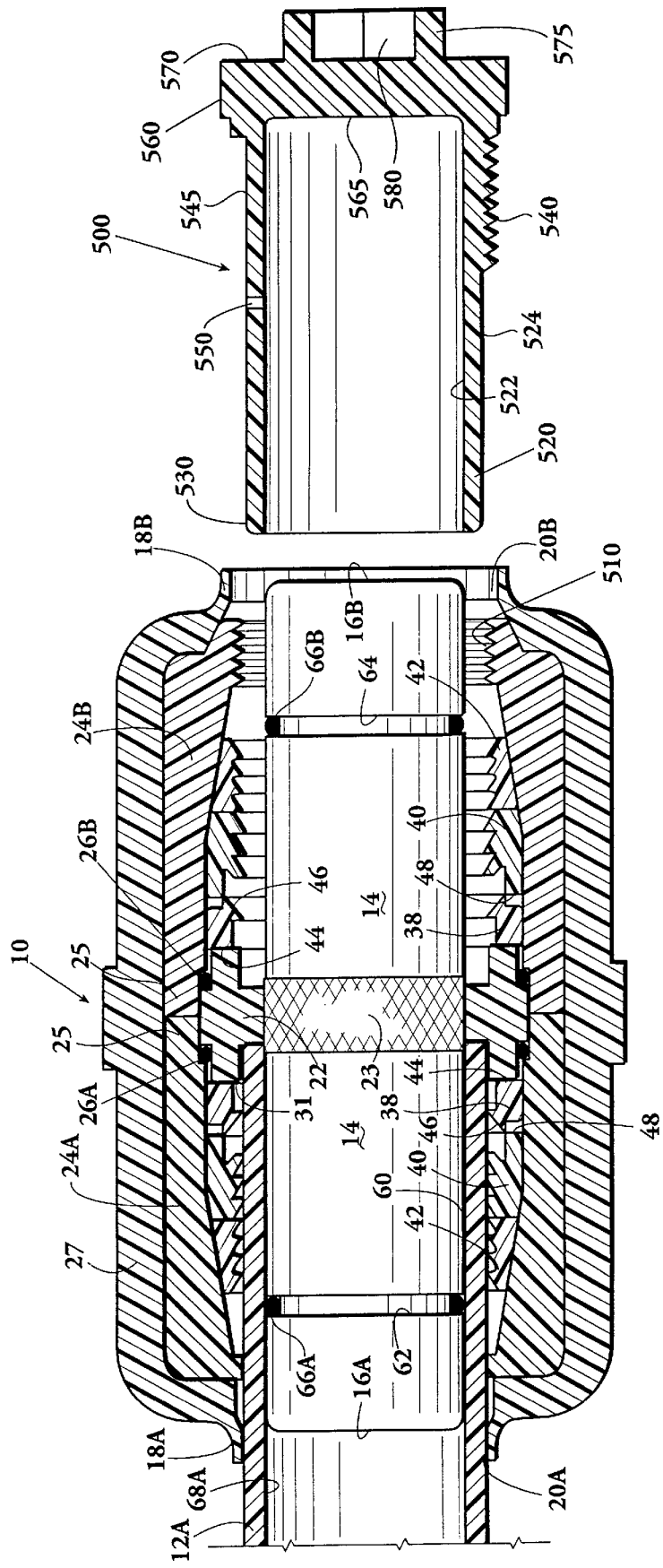
FIG. 1 is a cross-sectional elevational view of a combined plastic pipe coupler and end plug constructed according to a preferred embodiment of the present invention.
Figure 5:
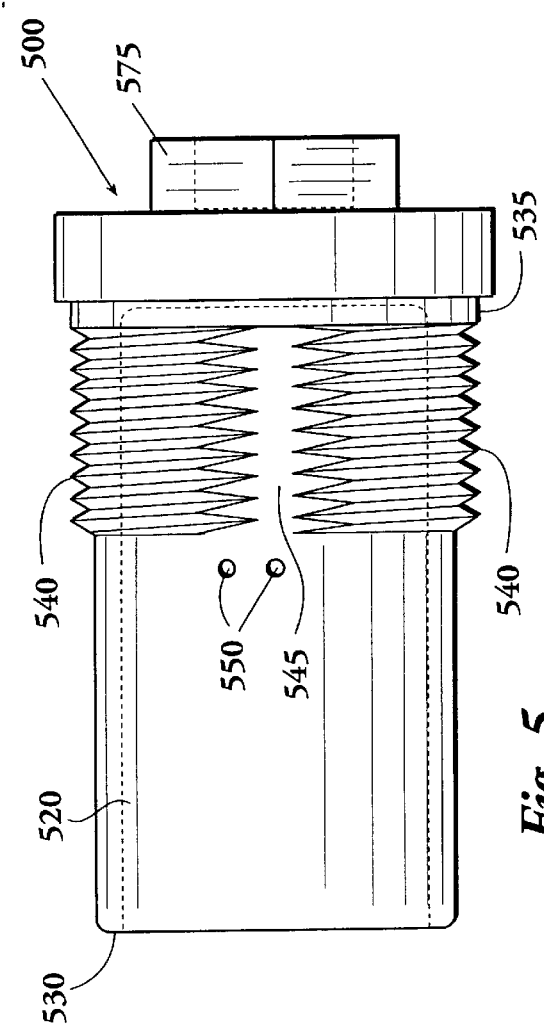
FIG. 5 is a top view of the end plug rotated 90° from FIG. 2.

Referring to the drawings in detail and, in particular, to FIGS. 1 and 5, there is illustrated a coupler 10 for use in securing a length of plastic pipe 12A to an end plug 500. The end plug 500 includes a cylindrical portion 520, a first end 535 and an opposed second end 530. The end plug 500 has an inner wall 522 having an inner diameter the same as the inner diameter of the pipe 12A and an outer wall 524 having an outer diameter. The end plug 500 has an end wall 560 which is sealably formed or attached to cylindrical portion 520.

The end wall 560 has an interior surface 565 and an exterior surface 570. The first end 535 of end plug 500 contains external, male threads 540 along the end plug outer diameter 524. An end plug thread flat portion 545 is located at the top of the end plug and extends axially. While a single thread flat portion is illustrated, it is possible that more than one flat portion could be employed. One or more vent holes 550 is located in the cylindrical portion 520.

A square or rectangular extension 575 is rigidly attached to the end wall exterior surface 570. The rectangular or square extension 575 may have a hollow core 580. One may rotate the end plug 500 by turning the outside of the square extension 575 by hand or with a wrench.

Returning to a consideration of the coupler 10, a straight tubular stiffener 14 extends through the coupler 10. The stiffener 14 is preferably constructed of rigid material, such as plastic or metal, and has ends 16A and 16B that are adjacent coupler ends 18A and 18B.

The stiffener 14 has an external diameter slightly smaller than the internal diameter of pipe 12A and slightly smaller than the internal diameter of cylindrical portion 520 in order to permit the pipe and the plug to be pushed on to the stiffener. As pipe 12A is pushed over and on to stiffener 14, it enters the coupler 10 via opening 20A provided in the end 18A. As end plug 500 is pushed over and on to the stiffener 14, it enters the coupler 10 via opening 20B provided in the end 18B.

The stiffener 14 is secured within coupler 10 by means of a hub 22 that encircles the stiffener approximately midway between ends 16A and 16B. A knurled area 23 is formed on stiffener 14 intermediate ends 16A and 16B. Knurled area 23 helps maintain hub 22 in position on stiffener 14, or hub 22 may be bonded to stiffener 14 at knurled area 23. In an alternate embodiment (not shown), the stiffener 14 and hub 22 are integrally formed.

Hub 22 is secured within coupler 10 between two hollow inner shell halves 24A and 24B. Each of the shell halves 24A and 24B has an inner end 25 of enlarged internal diameter so that the inner ends 25 of shell halves 24A and 24B receive and secure the hub 22 between the shell halves 24A and 24B. Positioned on both sides of an integral intermediate enlarged external diameter portion of hub 22 are O-rings 26A and 26B that seal hub 22 to the interior of shell halves 24A and 24B. Shell half 24B has internal threads 510 at its end.

A protective outer body 27 surrounds shell halves 24A and 24B and serves to hold the shell halves in position around hub 22. Hub 22, inner shell halves 24A and 24B, and outer protective body 27 are all preferably constructed of rigid material, such as tough plastic.

In operation, fluid flows through pipe 12A and into an through the stiffener 14. The O-rings 66A and 66B create a fluid tight seal.

While the coupler in FIG. 1 shows the pipe 12A engaged to the coupler by a stab-on fitting, other connections are possible. For example, pipe 12A may be fused to the stab-on coupler.

As shown in FIG. 1, end plug 500 is axially aligned with but completely disengaged and separated from the coupler 10.

Figure 2:
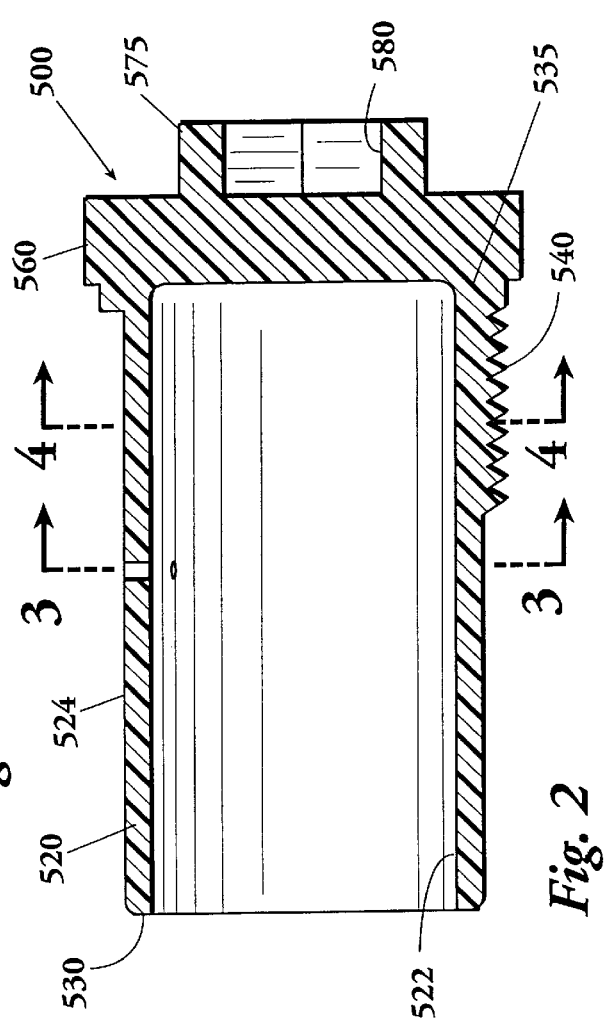
FIG. 2 is a cross-sectional elevational view of an end plug constructed according to a preferred embodiment of the present invention.
Figure 4:
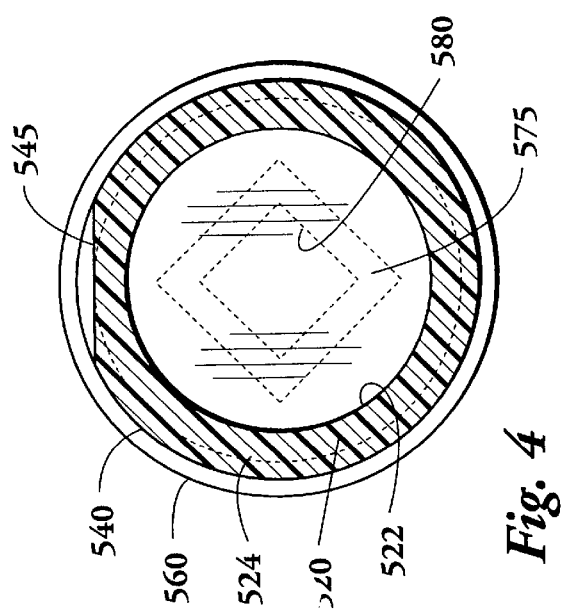
FIG. 4 is a cross-sectional end view taken along the lines 4—4 of FIG. 2.
Figure 3:
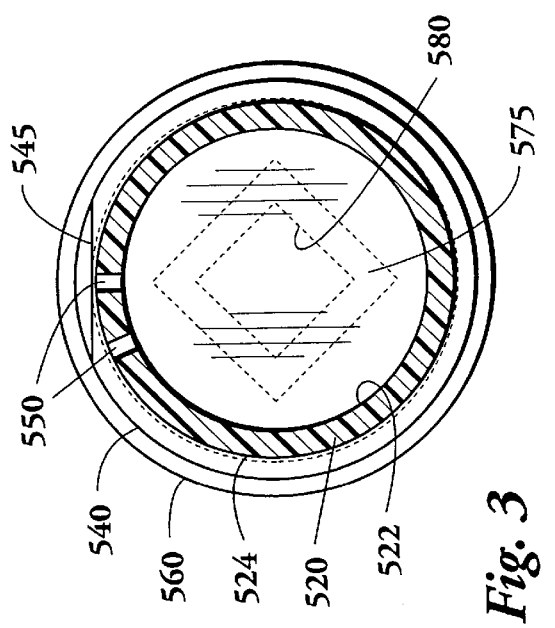
FIG. 3 is a cross-sectional end view of the end plug of FIG. 2 taken along section 3—3.

FIG. 2 illustrates a sectional view of the end plug 500 as shown in FIG. 1 apart from the coupler 10. FIG. 3 is a sectional view taken along section lines 3—3 of FIG. 2 so that each of the vent holes 550 is visible. The number of vent holes will be a matter of choice. FIG. 4 is a sectional view taken along section line 4—4 of FIG. 2 so that the end plug threads flat portion 545 is visible. As will be described, the flat portion 545 provides a passageway for fluid venting from inside the coupler. FIG. 5 shows the end plug rotated 90° from that shown in FIG. 2.

Figure 6:
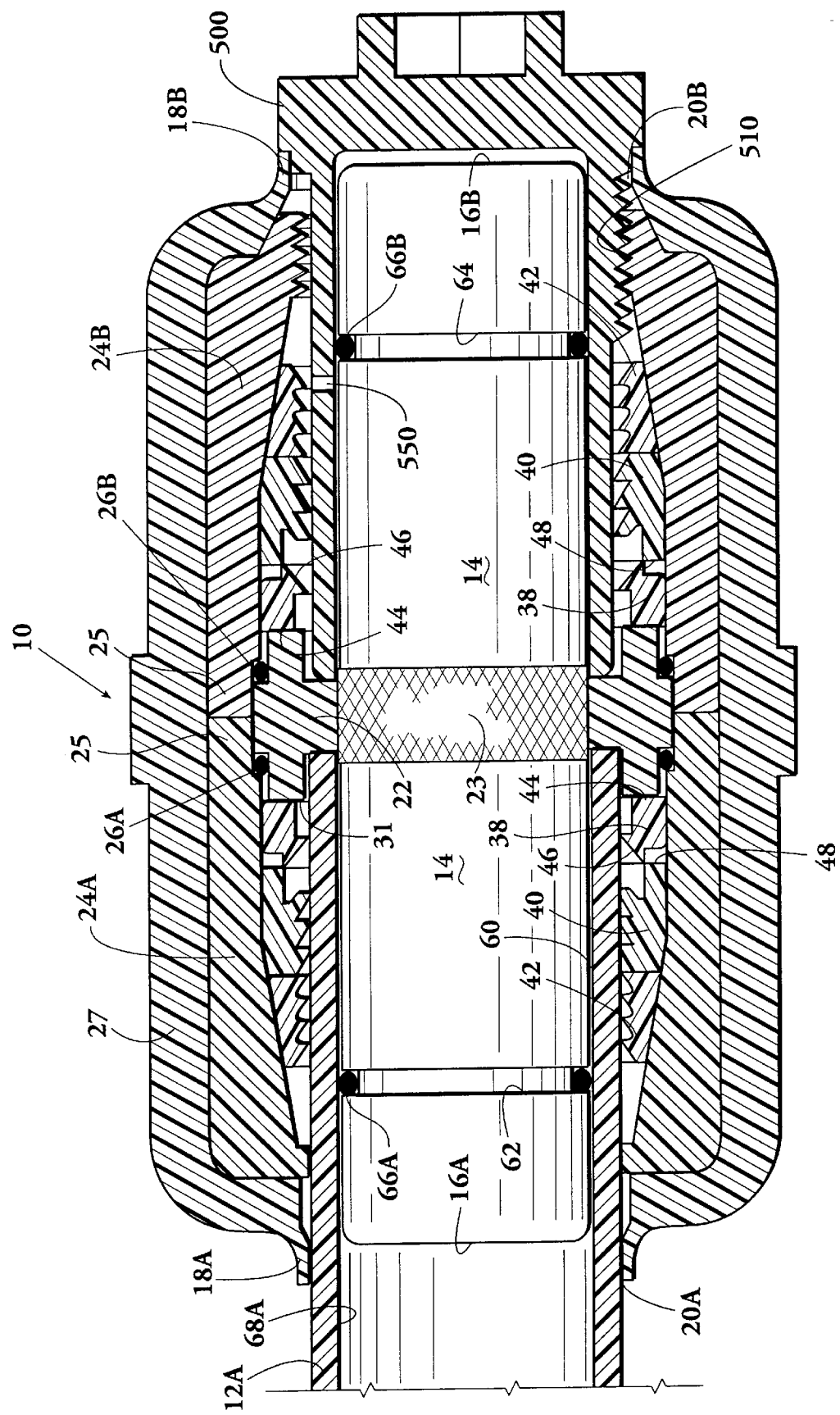
FIG. 6 is a cross-sectional elevational view of a combined plastic pipe coupler and fully-engaged end plug.

FIG. 6 shows a sectional view with the end plug 500 fully engaged within the coupler 10. The end plug 500 is installed in the coupler 10 by aligning and axially pushing end plug second end 530 into the opening of coupler end 20B. The inner wall 522 of the end plug will pass over the O-ring 66B on the stiffener.

When the end plug threads 540 on the cylindrical portion abut the female shell threads 510, the end plug 500 is rotated or turned in a clockwise direction to engage the end plug threads 540 with shell threads 510. As the end plug 500 is rotated, it continues to advance axially. When the end plug threads 540 and shell threads 510 are fully engaged, the vent hole or vent holes 550 are located between the O-rings 66A and 66B. The vent hole or holes 550 are not exposed to any pressurized fluids since the O-ring 66 creates a fluid seal with the inner wall 522 of the end plug. Thus, any pressurized fluids in the pipeline end 12A or the plug 500 will not be vented to outside of the fitting. In other words, fluid may pass from the pipe 12A, into and through the stiffener 14, fill the end plug 500 but will not be able to pass the O-ring 66B between the stiffener outside wall and end plug. The fluid-tight seal is created by the O-ring 66B against the end plug and not by the threads.

Figure 7:
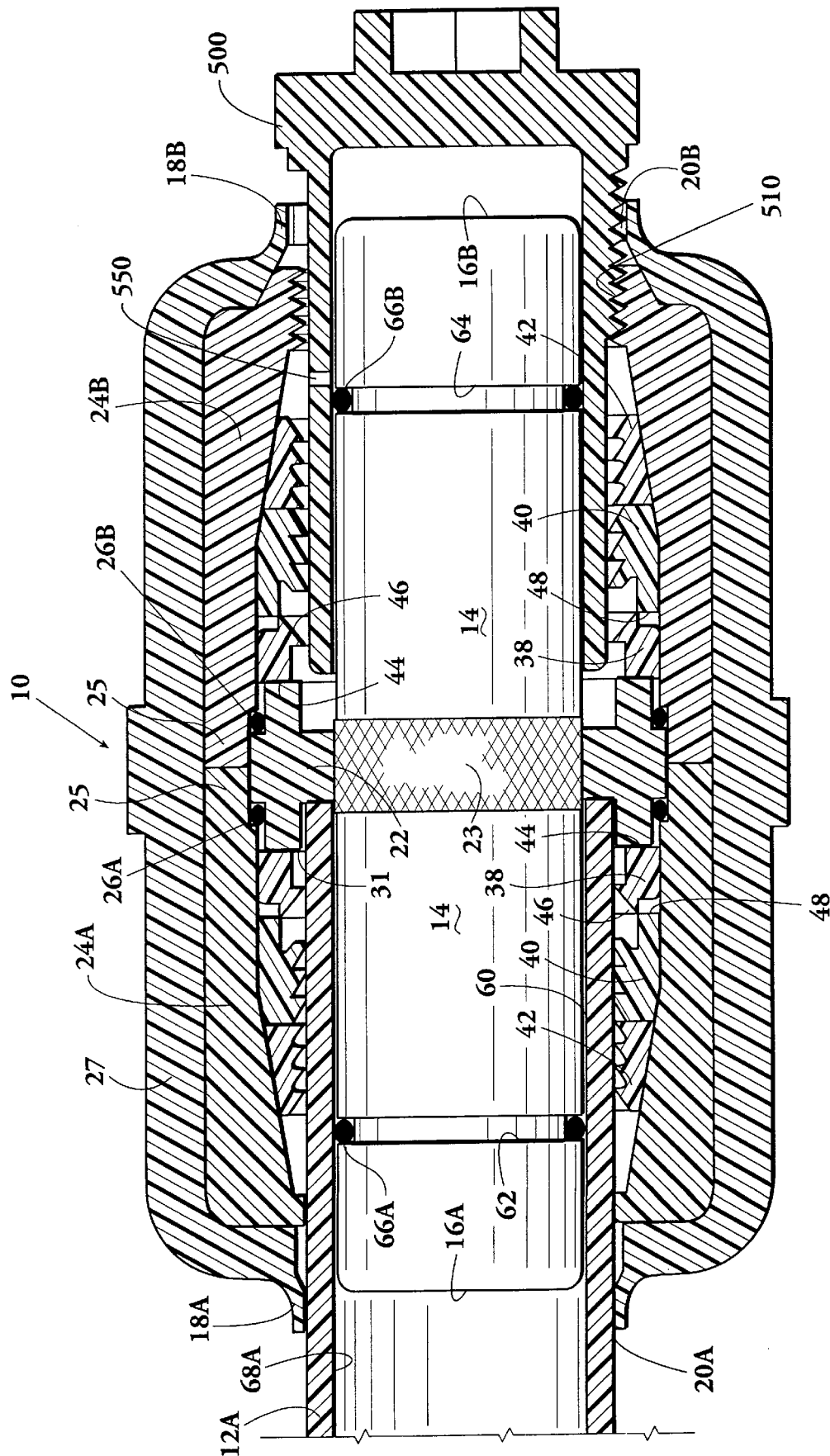
FIG. 7 is a cross-sectional elevational view of a plastic pipe coupler and partially-engaged end plug constructed according to a preferred embodiment of the present invention showing the venting position.

To disengage the end plug 500 from the coupler 10, a two stage process is employed. One rotates or turns the end plug 500 in a counter-clockwise direction. As seen in FIG. 7, an intermediate position is reached when the end plug is partially unthreaded. The vent hole 550 is positioned with respect to the threads 510 and 540 such that when the end plug is partially unthreaded and disengaged, the vent holes 550 will move from the left or inside of the O-ring 66B to the right or outside of the O-ring 66B. In this position, pressurized gas from the interior of the coupler 10 will be permitted to escape through vent hole 550, passing the end plug threaded flat portion 545, to the outside of the coupler.

FIG. 7 shows the end plug 500 partially unthreaded from coupler 10. In this intermediate position, the end plug 500 is still threaded on the coupler 10 but any pressurized fluid in the line may be purged. Finally, the coupler will only be fully disengaged after complete venting. The end plug may be unthreaded the rest of the way and then pulled axially away from the coupler.

Figure 8:
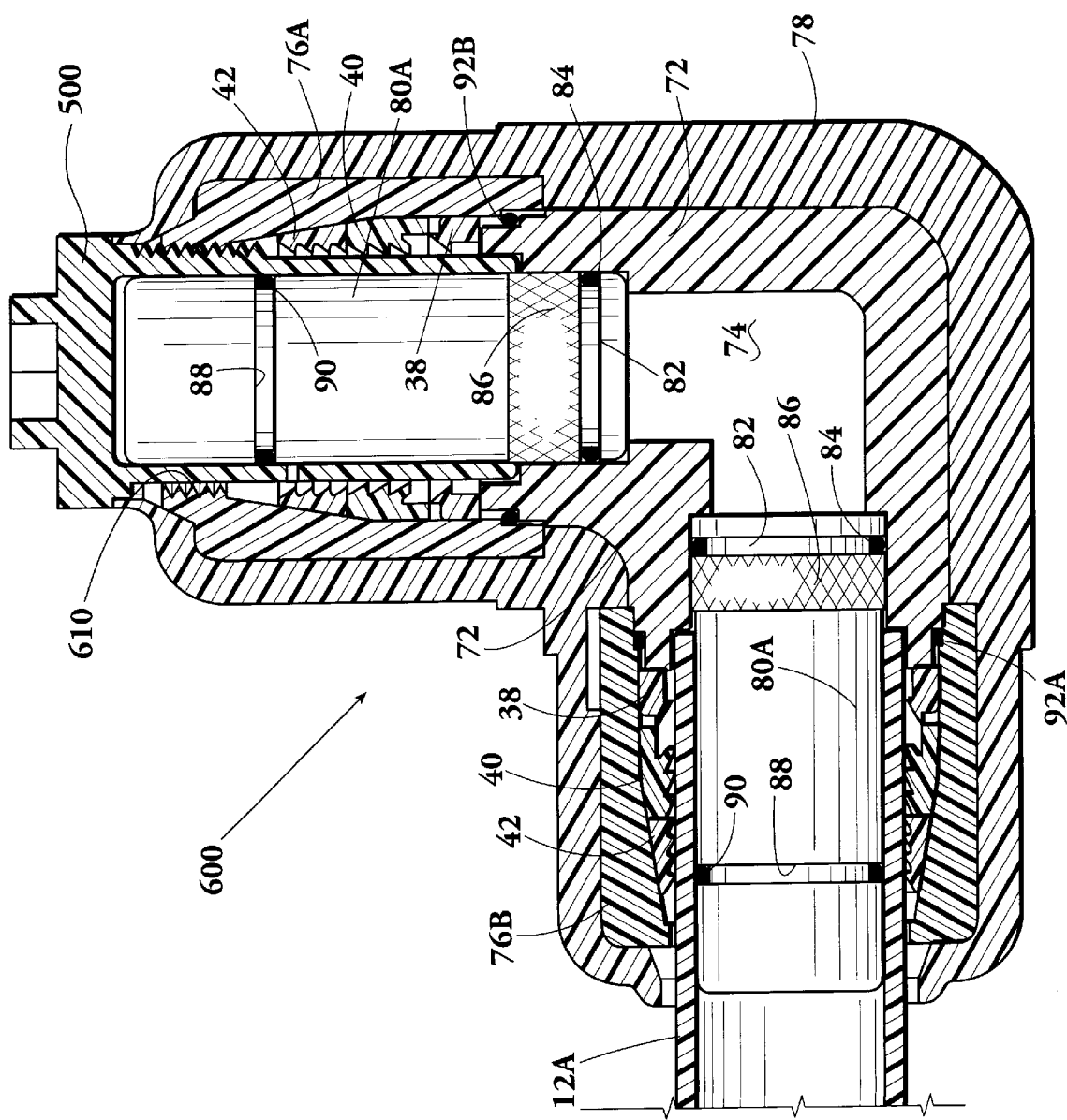
FIG. 8 is a cross-sectional view of an alternate embodiment of the invention illustrating an L-shaped coupler to connect two lengths of pipe at a right angle.

FIG. 8 shows an alternate embodiment of the invention wherein the coupler 600 is in the form of an elbow or "L" and where like numbered components have like functions as described with reference to FIGS. 1 through 7. The main structure or body 72 has a fluid passageway 74 therethrough.

Positioned at the ends of body 72 are shells 76A and 76B that correspond and function like shell 24A and 24B of FIGS. 1 through 7. Retained within shells 76A and 76B are followers 38, front boot seals 40 and grippers 42 all having the function as previously described. Shell 76A additionally has an internal threaded end 610.

Outer protective body 78 is molded of stiff plastic around the assembled internal components.

Extending from a first end of body 72 is a first stiffener 80A and extending from the second end of body 72 is a second stiffener 80B. Near the inner end of each of the stiffeners is a groove 82 that receives an O-ring 84. Each of the stiffeners includes a knurled portion 86 to assist in retaining the stiffeners in connection with coupler body 72 or the knurled portions may assist in bonding the stiffeners to the body.

Each stiffener has, adjacent its outer end, a circumferential exterior groove 88, with each of the grooves receiving an O-ring 90. Positioned within one end of the L-shaped coupler 600 is a plastic pipe 12A and in the other end of the coupler an end plug 500. Plastic pipe 12A is retained within the coupler by grippers 42, as previously described, with external sealing provided by followers 38 and front boot seals 40 as has been described with reference to FIGS. 1 through 7.

The end plug 500 is not retained in the coupler by grippers since the outside diameter of the cylindrical portion of the end plug is less than the outside diameter pipe. Accordingly, the end cap is removable and replaceable.

An important feature of the L-shaped fitting of FIG. 8 is the provision of O-rings 90 on stiffeners 80A and 80B that seal the stiffeners to the interior of the pipe 12B and the end plug 500. As previously stated, sealing by engagement of O-rings with the internal surfaces has increased effectiveness since the internal surfaces are less likely to be scratched or otherwise marred in handling.

Positioned about a first end of body 72 is an O-ring 92A and in like manner, positioned about the opposite end of body 72 is an O-ring 92B. O-rings 92A and 92B help maintain a leak proof relationship between body 72 and shells 76A and 76B.

As shown in FIG. 8, end plug 500 is completely threaded and engaged in the L-coupler 100. In order to install the end plug 500 in the coupler 10, the end plug is axially aligned and pushed into the opening of coupler 10. When the external end plug threads 540 abut the internal shell threads 610, one then turns the end plug 500 in a clockwise direction to engage the threads 610 with end plug threads 540. When the threads 540 and 510 are fully engaged, the vent hole 550 is located between the O-rings 90A and 90B. Thus, any pressurized gases or fluids in the pipeline end 12A or the plug 500 will not be vented outside the fitting.

The end plug may be unthreaded from the coupling for two purposes—to vent or purge pressurized fluids or to connect another pipe or fitting. To disengage the end plug 500 from the coupler 10, one rotates the end plug in a counter-clockwise direction. The vent hole or holes 550 is positioned with respect to the threads 510 and 540 such that when the threads are partially unthreaded and disengaged, the vent hole or holes 550 will move from the left of the O-ring 66B to the right of the O-ring 66B. In this position, pressurized fluid from the interior of the coupler 10 escapes through vent hole 550, passes the end plug threaded flat portion 545, to outside of the fitting. Once the pressurized fluid has been vented, and only then, the end plug can be unthreaded the rest of the way.

The present invention, thus, provides a mechanism to close off a fluid pipeline, to vent or purge a fluid pipeline, or to connect additional pipe or fittings to the pipeline. As can be appreciated from the foregoing, the teachings of the present invention may be employed on various alternate fittings, such as T-fittings.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An end plug and coupler for plastic pipe, said coupler having an opening for said end plug and a first shell with a passageway therethrough and said end plug comprising:

(a) a hollow, cylindrical portion having a first end and a second end;

(b) an end wall sealably attached to said cylindrical portion first end;

(c) external threads formed on said cylindrical portion at said first end wherein said external threads engage internal threads on an end of said first shell; and (d) at least one vent hole in said cylindrical portion of said end plug located in a contiguous vertical spacing void of said internal threads wherein a portion of said external threads on said cylindrical portion of said end plug are removed to create a pathway for fluid venting from said vent hole, said at least one vent hole allowing fluid to vent when said external threads are partially unthreaded from said internal threads on said shell.

2. An end plug and coupler as set forth in claim 1 wherein said coupler includes a rigid stiffener tube positioned within said first shell, said stiffener having an external diameter slightly less than the internal diameter of said hollow cylindrical portion and an external circumferential groove to receive a toroidal elastomeric seal and wherein said elastomeric seal creates a fluid tight connection with said cylindrical portion of said end plug.

3. An end plug and coupler as set forth in claim 1 wherein said hollow, cylindrical portion of said end plug has an external diameter less than said end plug opening of said plastic pipe.

4. An end plug and coupler as set forth in claim 1 wherein said end plus further comprises:
   (a) a multi-sided extension rigidly attached to an outer surface of said end wall; and
   (b) said end plug being turnable by applying a moment to interior or exterior portions of said extension.

5. An end plug and coupler as set forth in claim 1 wherein an outside diameter of said cylindrical portion is slightly less than the outside diameter of said plastic pipe.

6. A combined coupler with a removable end plug for securing a plastic pipe, comprising:
   (a) a hollow rigid coupler shell having opposed first and second ends and a passageway extending therethrough, the passageway being defined by a larger internal diameter portion adjacent said first end and a smaller internal diameter portion adjacent said second end and an internal frusto-conical surface tapering inwardly towards said second end;
   (b) a rigid stiffener tube positioned within said shell, the stiffener having an outer end, having an external diameter slightly less than the internal diameter of a pipe to be secured by the coupler and having an external circumferential groove therein spaced from said outer end;
   (c) a rigid, hollow gripper positioned within said shell having an internal circumferential surface configured to grippingly engage a pipe secured by the coupler;
   (d) a toroidal elastomeric seal received in said stiffener tube circumferential groove configured to engage the internal surface of a pipe secured by the coupler;
   (e) an end plug including a hollow, cylindrical portion having a first end and a second end, an end wall sealably attached to said first end, external threads formed adjacent first end, wherein said external pipe threads engage internal threads on an end of said coupler shell when said second end extends into said shell; and
   (f) at least one vent hole in said end plug cylindrical portion between said internal threads and said second end, said vent hole allowing fluid to vent from said coupler through said cylindrical portion when said external threads are partially disengaged from said internal threads on said shell end.

7. A combined coupler with a removable end plug as set forth in claim 6 wherein a portion of said external threads on said end cylindrical portion are removed to facilitate said fluid venting.

8. A combined coupler with a removable end plug for securing a plastic pipe according to claim 6, including a second hollow rigid coupler shell configured as said first mentioned coupler shell having a first end and where the second coupler shell is supported in alignment with said first coupler shell second end, the coupler shells being in coaxial alignment and wherein said stiffener tube extends into both said first and said second coupler shell and wherein said stiffener tube has opposed outer ends and has an external circumferential grooves thereon spaced from each of said outer ends, and including a second gripper having a configuration substantially the same as said first mentioned gripper and positioned within said second coupler shell, and a toroidal elastomeric seal received in each said stiffener circumferential groove.

9. A combined coupler with a removable end plug as set forth in claim 6 further comprising:
   (a) a rectangular extension rigidly attached to an outer surface of said end wall; and
   (b) said end plug being turnable by applying a moment to said extension.

10. A method for providing a temporary terminus for a plastic pipeline with a stab-type pipe coupler, comprising the steps of:
   (a) inserting said stab-type coupler on an end of said plastic pipeline so that said end is received over a tubular stiffener;
   (b) engaging said pipeline end with a rigid hollow gripper positioned within said shell of said coupler to grippingly engage said pipe;
   (c) inserting a hollow, cylindrical portion of an end plug into an opening in said coupler so that said end plug is received over said tubular stiffener and a toroidal seal on said stiffener; and
   (d) threading said end plug on to said coupler by engaging external threads on said cylindrical portion of said end plug with internal threads on said coupler shell.

11. A method of venting a pressurized pipeline terminating in a stab-type coupler and an end plug prior to removing said end plug therefrom, which method comprises:
   (a) partially unthreading said end plug having external threads from said stab-type coupler to move the end plug axially to a position where at least one vent hole in said end plug is moved from inside an O-ring to outside an O-ring;
   (b) venting fluid from said pipeline through said vent and through a pathway created by removing a portion of said external threads; and
   (c) unthreading said end plug from said stab-type coupler a remaining amount only after venting of fluid from said coupler.

* * * * *